United States Patent
Kolli et al.

(10) Patent No.: US 11,099,991 B2
(45) Date of Patent: Aug. 24, 2021

(54) PROGRAMMING INTERFACES FOR ACCURATE DIRTY DATA TRACKING

(71) Applicant: VMware, Inc., Palo Alto, CA (US)

(72) Inventors: Aasheesh Kolli, Santa Clara, CA (US); Irina Calciu, Palo Alto, CA (US); Jayneel Gandhi, Sunnyvale, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 125 days.

(21) Appl. No.: 16/256,562

(22) Filed: Jan. 24, 2019

(65) Prior Publication Data

US 2020/0242035 A1     Jul. 30, 2020

(51) Int. Cl.
*G06F 12/08* (2016.01)
*G06F 12/0817* (2016.01)
*G06F 12/0864* (2016.01)

(52) U.S. Cl.
CPC ...... *G06F 12/0828* (2013.01); *G06F 12/0864* (2013.01); *G06F 2212/152* (2013.01); *G06F 2212/603* (2013.01); *G06F 2212/621* (2013.01)

(58) Field of Classification Search
CPC ............. G06F 12/0828; G06F 12/0864; G06F 2212/152; G06F 2212/621; G06F 2212/603
See application file for complete search history.

(56) References Cited

U.S. PATENT DOCUMENTS

| | | |
|---|---|---|
| 6,275,907 B1 * | 8/2001 | Baumgartner ...... G06F 12/0828 711/119 |
| 6,711,653 B1 | 3/2004 | Quach et al. |
| 9,003,131 B1 * | 4/2015 | Lunev .................. G06F 3/0668 711/147 |
| 10,445,238 B1 | 10/2019 | Diestelhorst et al. |
| 2002/0013886 A1 * | 1/2002 | Higuchi .............. G06F 12/0817 711/130 |
| 2014/0112339 A1 | 4/2014 | Safranek et al. |
| 2015/0052309 A1 * | 2/2015 | Philip ................. G06F 12/0864 711/128 |
| 2016/0246724 A1 * | 8/2016 | Boehm ............... G06F 12/0833 |
| 2017/0277636 A1 * | 9/2017 | Lee ........................ G06F 12/126 |
| 2019/0004851 A1 | 1/2019 | Doshi et al. |
| 2019/0303295 A1 * | 10/2019 | Steinmacher-Burow .................... G06F 12/084 |
| 2020/0042446 A1 | 2/2020 | Mittal et al. |

(Continued)

*Primary Examiner* — Masud K Khan
(74) *Attorney, Agent, or Firm* — Patterson + Sheridan, LLP

(57) ABSTRACT

Described herein is a method for tracking changes to memory locations made by an application. In one embodiment, the application decides to start tracking and sends a list of virtual memory pages to be tracked to an operating system via an interface. The operating system converts the list of virtual memory pages to a list of physical addresses and sends the list of physical addresses to a hardware unit which performs the tracking by detecting write backs on a coherence interconnect coupled to the hardware unit. After the application ends tracking, the application requests a list of dirty cache lines. In response to the request, the operating system obtains the list of dirty cache lines from the hardware unit and adds the list to a buffer that the application can read. In other embodiments, the operating system can perform the tracking without the application making the request.

21 Claims, 10 Drawing Sheets

(56) References Cited

U.S. PATENT DOCUMENTS

2020/0241978 A1  7/2020  Kolli et al.
2020/0242036 A1  7/2020  Kolli et al.

\* cited by examiner

PROGRAMMING INTERFACES FOR ACCURATE DIRTY DATA TRACKING

BACKGROUND

Applications do not have a mechanism to determine the data the application modifies within a region of memory accessed by the application without incurring expensive logging costs. An operating system supporting the application is privy to such information using features like Page Modification Logging (PML) or write-protected pages but such virtual memory based approaches can only track dirty data information at page granularity and can significantly overestimate the amount of actual dirty data.

It is desirable to improve the granularity of tracking of modified application data without significantly impacting performance of the application or altering the code of the application.

SUMMARY

An embodiment is a method for tracking changes made by an application. The method includes a method for tracking changes made by an application. The method includes starting tracking of an application by sending a command to a hardware unit to register a list of physical addresses for tracking, where the list of the physical addresses represents locations in memory changeable by the application, sending a request to the hardware unit for a list of dirty cache lines after tracking of the application is ended, receiving the list of dirty cache lines from the hardware unit, and adding the list of dirty cache lines to a buffer.

Further embodiments include a computer-readable medium containing instructions for carrying one or more aspects of the above method, and a system configured to carry out one or more aspects of the above method.

DETAILED DESCRIPTION

Embodiments described herein provide a facility for tracking changes made by an application to a portion of memory that the application accesses. The facility includes an interface between the application and an operating system or hypervisor that recognizes submission of a list of virtual memory pages of the application to be tracked and a request to obtain cache lines in the physical address space corresponding to the virtual memory pages that were modified by the application.

Figure 1A:
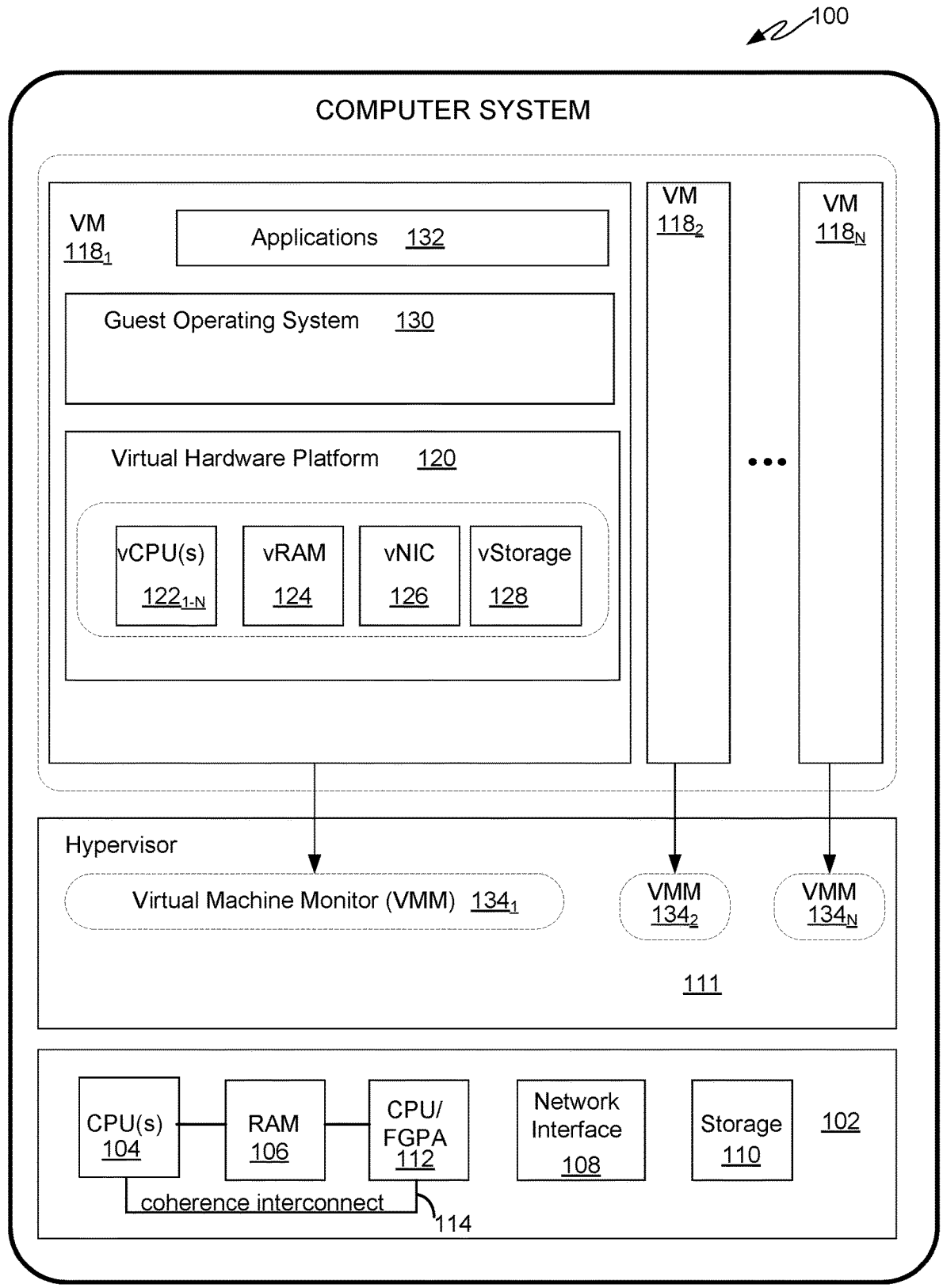
FIG. 1A depicts a block diagram of a computer system that is representative of a virtualized computer architecture in which embodiments may be implemented.

FIG. 1A depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, a point-to-point coherence interconnect 114 between processors, such as the Intel® UltraPath Interconnect (UPI), which is a successor to the Intel® QuickPath Interconnect (QPI), which supports a cache coherence protocol, a random access memory (RAM) 106, one or more network interfaces 108, and persistent storage 110. In the embodiment illustrated herein, another item of processing hardware, a field programmable gate array (FPGA) 112, is installed in one of the CPU sockets and communicates with one or more CPUs 104 via coherence interconnect 114. Though the following discussion has the FPGA occupy a CPU socket, the embodiments are not so limited; any arrangement of the FPGA that includes a connection to the coherence interconnect among processors present in computer system 100 is sufficient. Further, though certain aspects are described with respect to an FPGA tracking changes to a portion of memory, it should be understood that a different computing unit (e.g., processor, CPU, etc.) may instead be used to perform the functions described with respect to the FPGA.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VIVI 118 with hypervisor 111 is facilitated by the virtual machine monitors (VMMs) 134. Each VMM $134_1$-$134_N$ is assigned to and monitors a corresponding VIVI $118_1$-$118_N$. In one embodiment, hypervisor 111 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VIVI $118_1$-$118_N$ encapsulates a physical computing machine platform that is executed under the control of hypervisor 111. Virtual devices of a VIVI 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1 may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 120 may be merged with and into VMM 134.

Figure 1B:
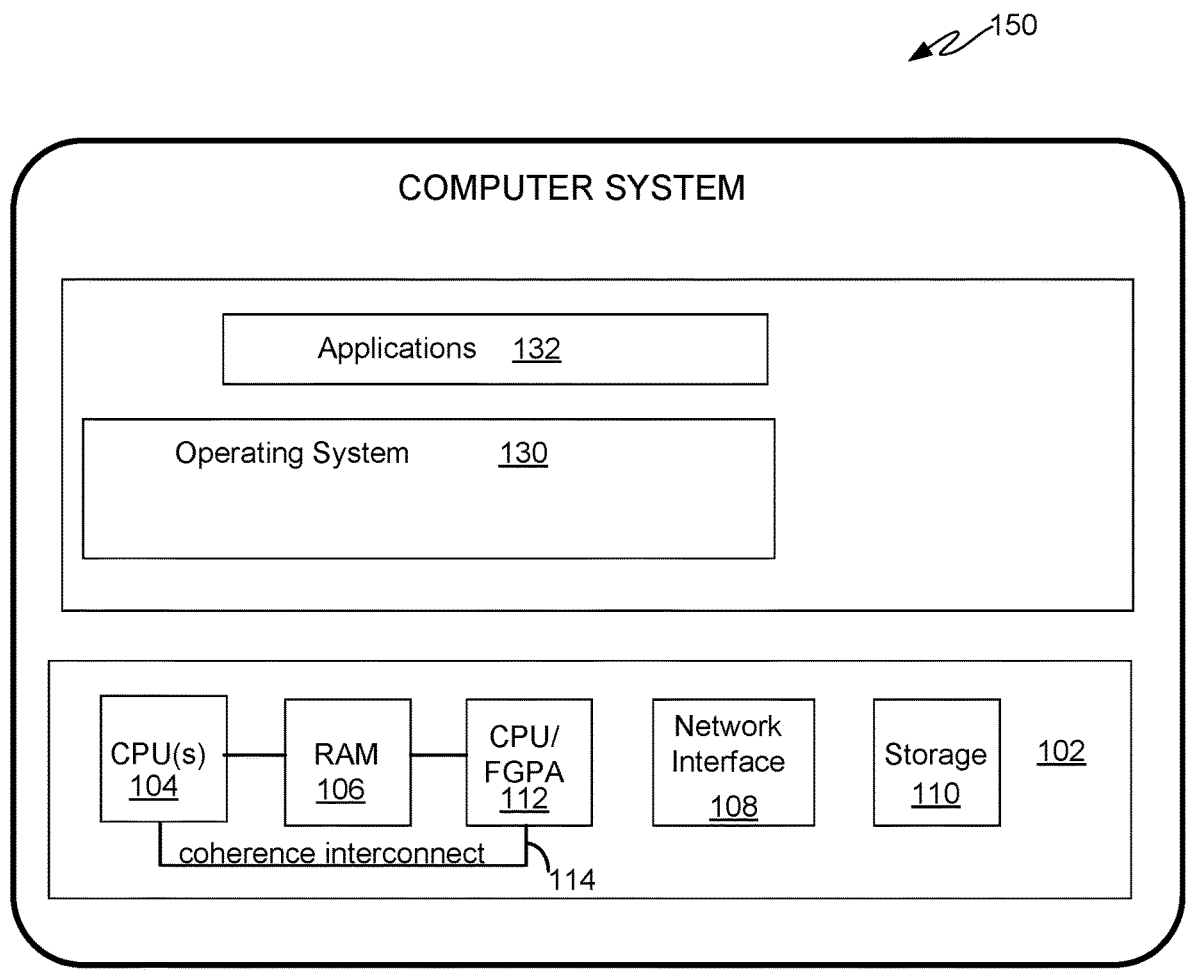
FIG. 1B depicts a block diagram of a computer system that is representative of an alternative computer architecture in which embodiments may be implemented.

FIG. 1B depicts a block diagram of computer system 150 that is representative of an alternative computer architecture in which embodiments may be implemented. Hardware platform 102 is the same as that in FIG. 1A. Also similar to FIG. 1A, a field programmable gate array (FPGA) 112, can be installed in one of the CPU sockets and communicates with one or more CPUs 104 via coherence interconnect 114. Hardware platform 102 supports the installation of an operating system (OS) 130, which is capable of executing applications 132. Examples of an OS 130 include any of the well-known commodity operating systems, such as the Microsoft Windows® operating system, and the Linux® operating system, and the like. Further, though certain aspects are described with respect to an FPGA tracking changes to a portion of memory, it should be understood that a different computing unit (e.g., processor, CPU, etc.) may instead be used to perform the functions described with respect to the FPGA.

Figure 2A:
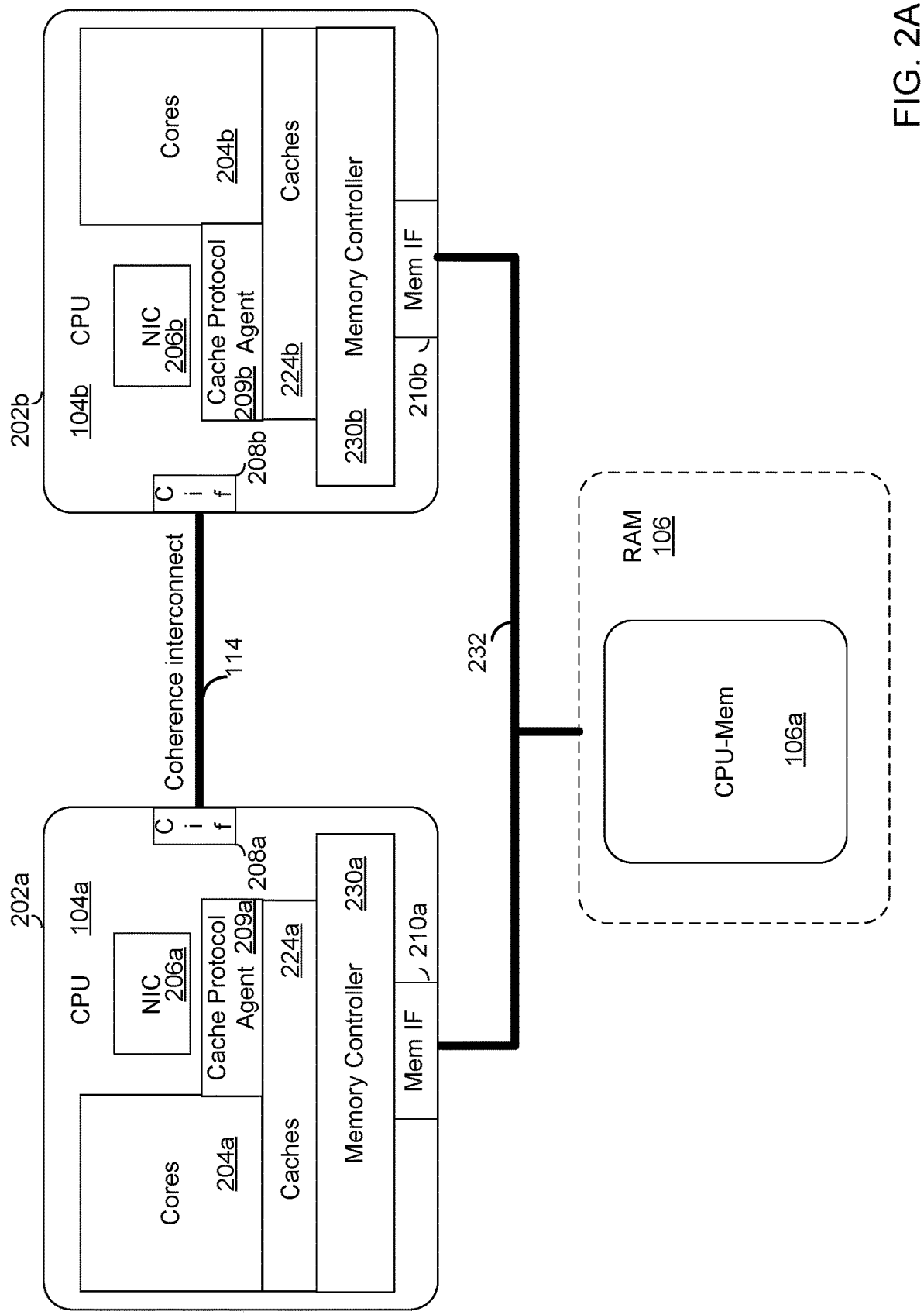
FIG. 2A depicts a block diagram of a pair of CPU sockets for CPUs in FIG. 1, in an embodiment.

FIG. 2A depicts a block diagram of a pair of CPU sockets, a first socket 202a for CPU 104a and a second socket 202b for CPU 104b. CPU 104a includes one or more processing cores 204a, a memory controller 230a, an interface 210a to CPU memory (CPU-Mem) 106a accessible by CPU 104a via bus 232, a network interface controller (MC) 206a, and a communications interface (cif) port 208a connected to coherence interconnect 114. Similarly, CPU 104b includes one or more processing cores 204b, a memory controller 230b, an interface 210b to CPU memory (CPU-Mem) 106b accessible by CPU 104b via bus 232, a network interface controller (MC) 206b, and a communications interface (cif) port 208b connected to coherence interconnect 114.

In one embodiment, CPU 104a has one or more caches 224a, and CPU 104b has one or more caches 224b, which are used to reduce the average cost to access data from memory. A memory controller 230a, 230b transfers cache lines between RANI 106 and respective caches 224a, 224b. A cache line (sometimes called a cache block) generally refers to a block of data of fixed size that is transferred between a memory location and a cache. When the memory controller 230a, 230b, copies a cache line from RAM 106 respectively into caches 224a, 224b, a cache entry is created, which may include the copied data as well as the memory location from which the data was copied (which may be called a tag). When CPU 104a, 104b needs to read or write a location in RAM 106, it first checks for a corresponding entry in respective caches 224a, 224b. Caches 224a, 224b check for the contents of the requested memory location in any cache lines that might contain that address. If CPU 104a, 104b finds that the memory location is in caches 224a, 224b, a cache hit has occurred; CPU 104a, 104b immediately reads or writes the data in the cache line. However, if CPU 104a, 104b does not find the memory location in caches 224a 224b, a cache miss has occurred. For a cache miss, caches 224a, 224b allocate a new entry and the respective memory controller 230a, 230b copies data from RAM 106. CPU 104a, 104b then accesses the requested memory location respectively from the contents of caches 224a, 224b.

Figure 2B:
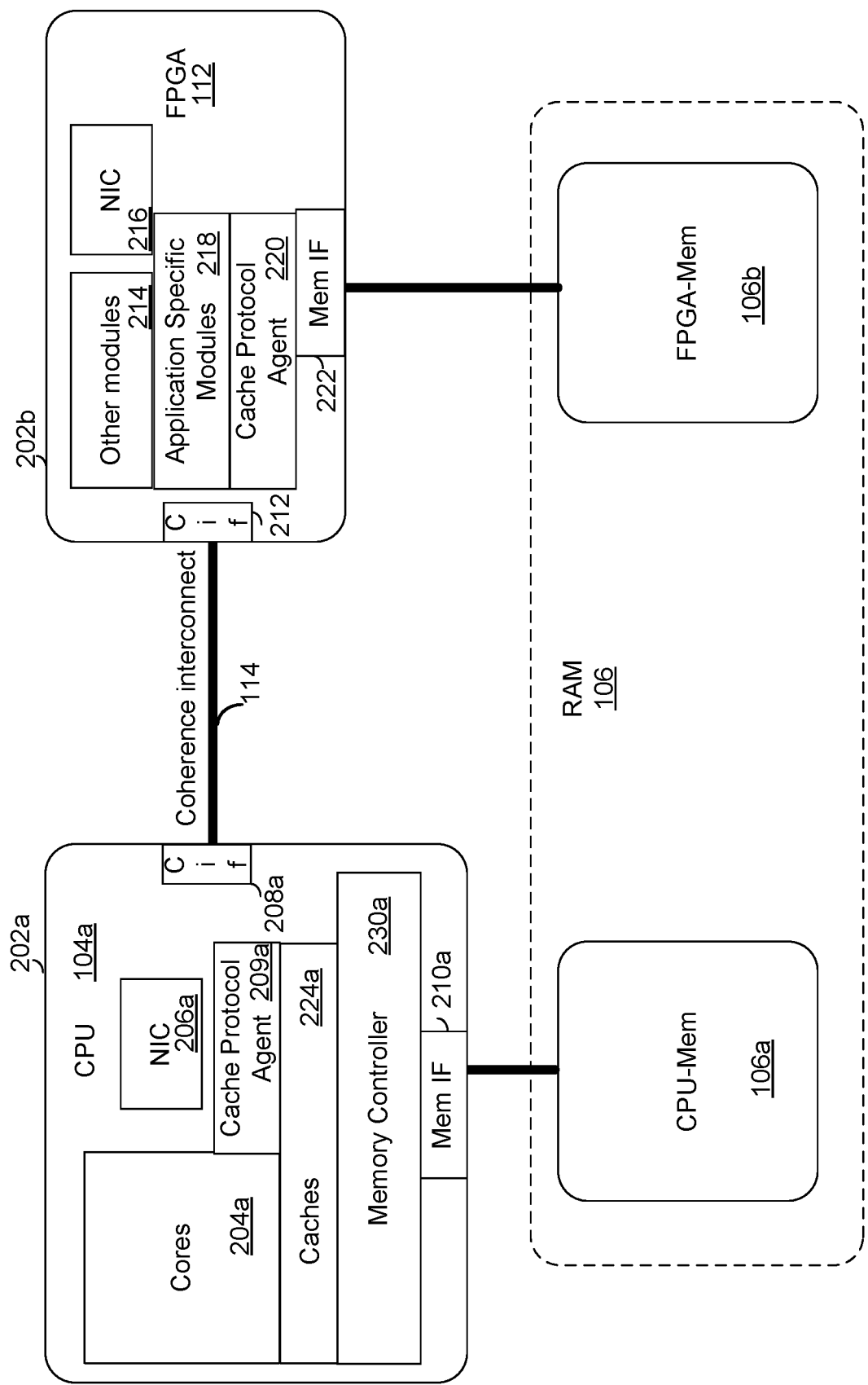
FIG. 2B depicts a block diagram of a pair of CPU sockets, a first socket for CPU and a second socket an FPGA.

FIG. 2B depicts a block diagram of a pair of CPU sockets, a first socket 202a for CPU 104a and a second socket 202b for FPGA 112. CPU 104a includes one or more processing cores 204a, a memory controller 230a, an interface 210a to CPU memory (CPU-Mem) 106a accessible by CPU 104a, a network interface controller (MC) 206a, and a communications interface (cif) port 208a connected to coherence interconnect 114. FPGA 112 is configured with a network interface controller (MC) 216, one or more application-specific modules 218, a cif port 212 and a cache protocol agent 220. Application specific modules 218 are configured by a bitstream representing custom programming of FPGA 112. Other modules 214 whose operations are unrelated to application-specific modules 218 may be present in FPGA 112, these modules and components being configured by a bitstream different from the custom programming bitstream. FPGA 112 has an interface 222 to its own memory, FPGA-Mem 106b, which can be a portion of RANI 106. In one embodiment, each CPU socket, 202a, 202b, represents a separate Non-Uniform Memory Access (NUMA) domain. The application or the VM is running on CPU 104a, located on first socket 202a, while FPGA 112 is located on the second socket 202b Cif ports 208a, 208b, 212, mentioned above, support a coherence protocol, which is designed to maintain cache coherence in a system with many processors each having its cache or caches. With respect to FIG. 2B, with FPGA 112 residing in one socket 202b of the CPU sockets and having its own cif port 212, FPGA 112 can monitor and participate in the coherency protocol that keeps the processors' caches coherent. Similarly, as discussed, with respect to FIG. 2A, CPU 104b could instead perform the functions described herein with respect to FPGA 112.

Cache coherence on coherence interconnect 114 is maintained according to a standard cache coherence protocol, such as modified, exclusive, shared, invalid (MESI) protocol or modified, exclusive, shared, invalid, forwarded (MESIF) protocol. In these protocols, cache lines marked invalid signify that the cache line has invalid data and must be brought into caches 224 from RAM 106 accessible by caches 224. Cache lines marked exclusive, shared, and forwarded (in the MESIF protocol) all signify that the cache line has valid data, but the cache line is clean (not modified), so the cache line can be discarded without writing the cache line back the data to RANI 106. A cache line marked as modified signifies the cache line is modified or dirty and must be written back to RANI 106 before the cache line is discarded from caches 224.

To enforce the cache coherence protocol requires a cache protocol agent for each cache connected to a coherence interconnect. Each cache protocol agent can initiate and respond to transactions on coherence interconnect 114 by sending and receiving messages on interconnect 114. In the present embodiments, CPU 104a has a cache protocol agent 209a, CPU 104b has cache protocol agent 209b and FPGA 112 has a cache protocol agent 220. Cache protocol agent 209a cooperates with cache protocol agent 209b or 220 by sending messages, including broadcast messages, over coherence interconnect 114. In the protocol, one of the cache protocol agents among the several agents present is an owner of a set of cache lines and contains information regarding those cache lines. The other cache protocol agents send messages to the owner agent requesting a cache line or to find the status of cache line owned by the owner agent.

The owner agent may service the request directly or request that another cache protocol agent satisfy the request.

When a CPU 104*a* accesses a cache line that is not in its caches 224*a*, at any level of the cache hierarchy, it is cache protocol agent 209*a* of CPU 104*a* that requests the cache line from RAM 106. Thus, cache protocol agent 209*a* in CPU 104*a* issues a load cache line transaction on coherence interconnect 114. The load cache line transaction can be 'Load Shared' for sharing the cache line, or 'Load Exclusive' for cache lines that will be modified. A cache line that is loaded as shared means that the line probably will not be modified. In contrast, a cache line that is loaded as 'Exclusive' is considered potentially dirty, because it is not certain the cache line will be modified. When the cache line gets evicted from caches 224*a* to RANI 106, if it is modified, it must be written back to RAM 106, the memory from which it originated. The operation of writing the cache line is passed on coherence interconnect 114 as a writeback transaction and can be monitored for tracking dirty cache lines. In the case of a writeback transaction, the cache line is actually dirty, rather than potentially dirty. In the description that follows, a writeback transaction is handled as a message, 'WB Data CL', that is received by hardware unit 308. CPU 104*b*, its caches 224*b* and its protocol agent 209*b* operate in a similar manner to CPU 104*a*, its caches 224*a* and its protocol agent 209*a*.

To confirm whether a cache line is dirty or not, a cache protocol agent, such as cache protocol agent 220 in FPGA 112, can snoop the cache line in accordance with the coherence interconnect protocol. If cache protocol agent 220 determines the cache line is dirty, the snoop triggers a write back transaction. Cache protocol agents 209*a*, 209*b*, 220 also have information regarding the cache lines that are resident in the processors' caches. Information regarding the cache lines is accessible via coherence interconnect 114.

Figure 3:
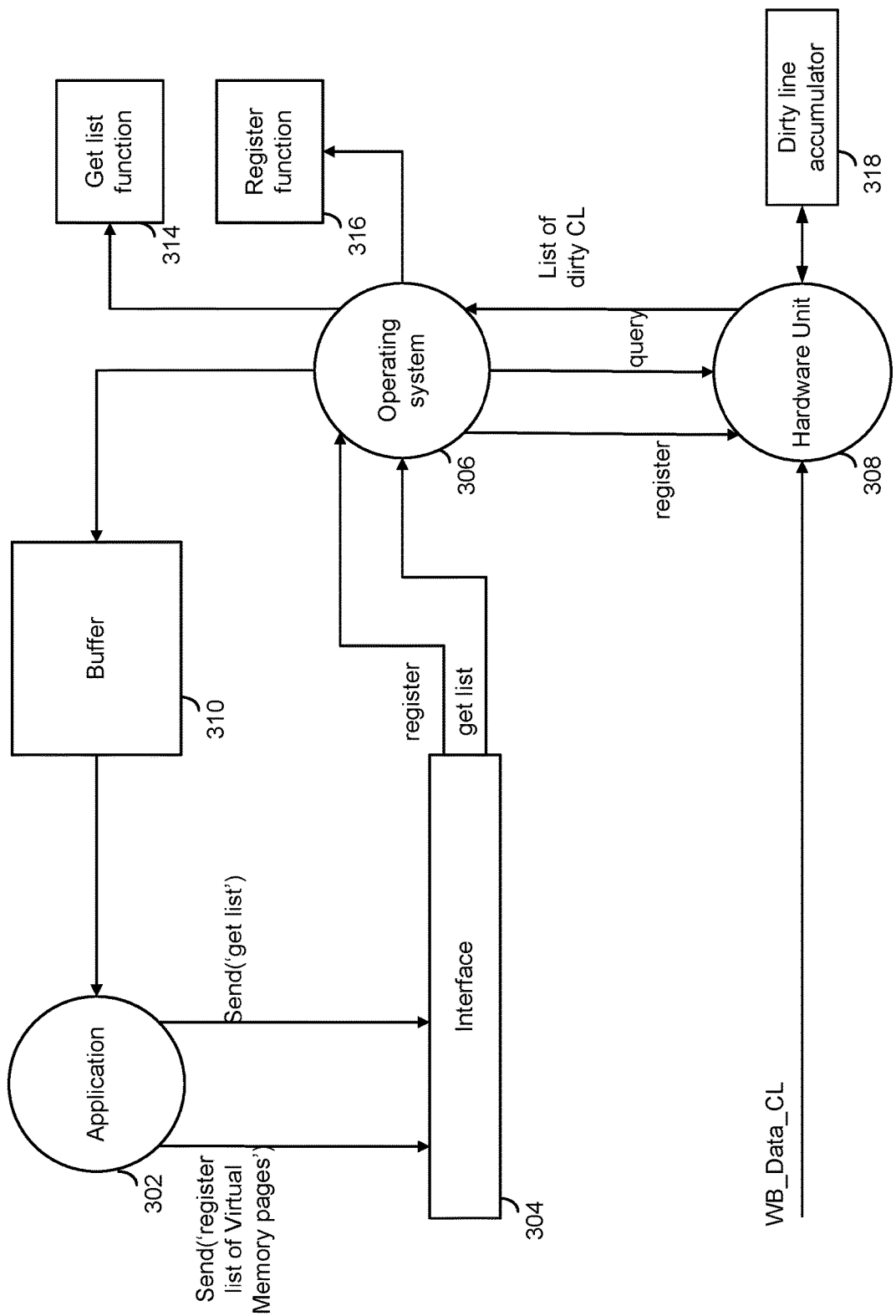
FIG. 3 depicts a diagram of the modules and functions for the interface in an embodiment.

FIG. 3 depicts a diagram of the modules and functions for the interface, in an embodiment. The modules and functions using interface 304 between application 302 and operating system 306 include an application 302, an operating system or hypervisor 306, a hardware unit 308 for tracking dirty cache lines, a dirty line accumulator 318 coupled to hardware unit 308, a buffer 310, a get list function 314 and a register function 316. In an embodiment, application 302 is one of applications 132 and interface 304 is between the application and guest operating system 130 when the guest operating system is run as part of one of virtual machines 118$_1$-118$_N$ supported by hypervisor 111. In another embodiment, interface 304 is between an application 132 running directly on an operating system 130 in FIG. 1B when there is no virtualization software.

Figure 4:
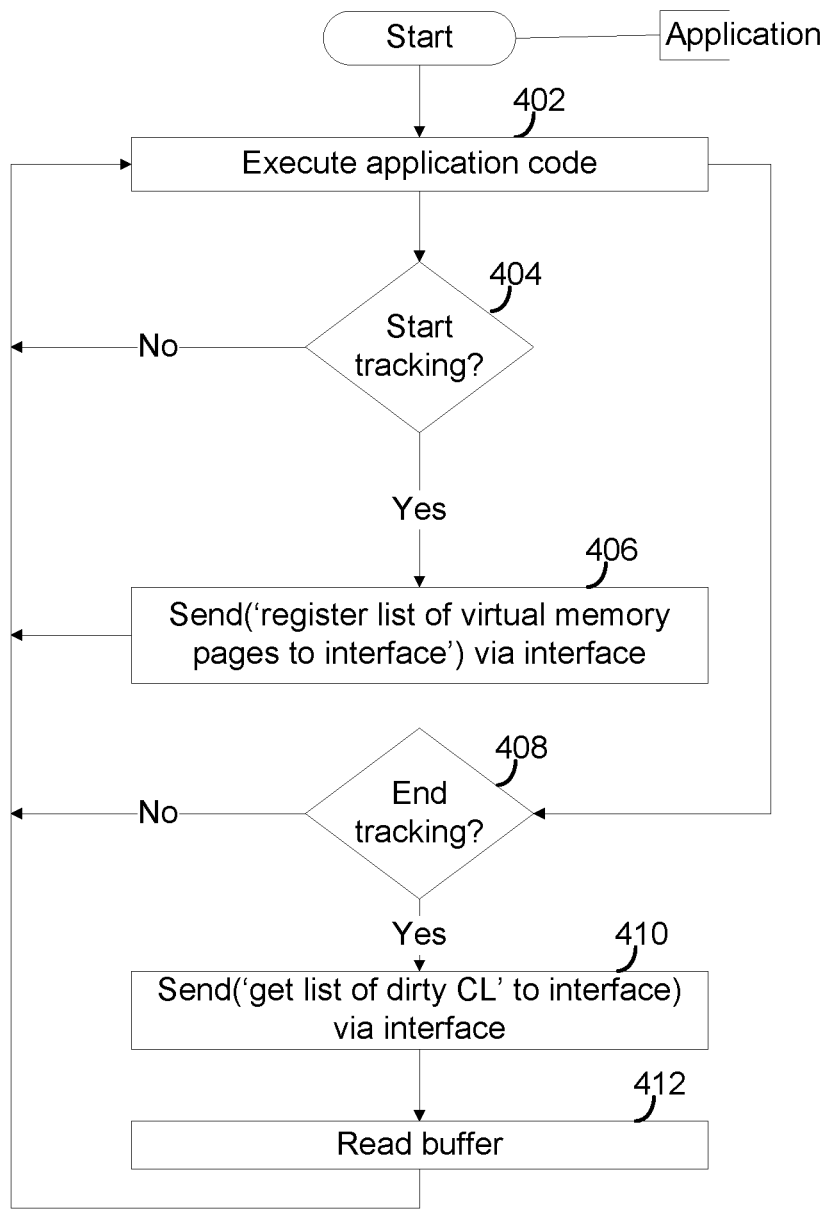
FIG. 4 depicts a flowchart of operations performed by an application when communicating with the interface, in an embodiment.

FIG. 4 depicts a flowchart of operations performed by an application when communicating via the interface with operating system 306, in an embodiment. In step 402, application 302 executes its application code. If the code of application 302 includes a request to start tracking of dirty cache lines, as determined in step 404, then in step 406, application 302 sends a 'register list of virtual memory pages' to operating system 306 via interface 304. In one embodiment, the message is a system call having the format 'StartTracking(<list>memory pages)'. If the code of application 302 includes a request to end tracking of cache lines, as determined in step 408, then in step 410, application 302 sends a 'get list of dirty cache lines' (CL) to operating system 306 via interface 304. In one embodiment, the message is a system call having the format 'EndTracking (<list>dirty_cachelines)'. In step 412, application 302 reads buffer 310 which contains the requested list of dirty CL. In one embodiment, buffer 310 is accessible in the user space of the operating system or guest operating system.

Figure 5:
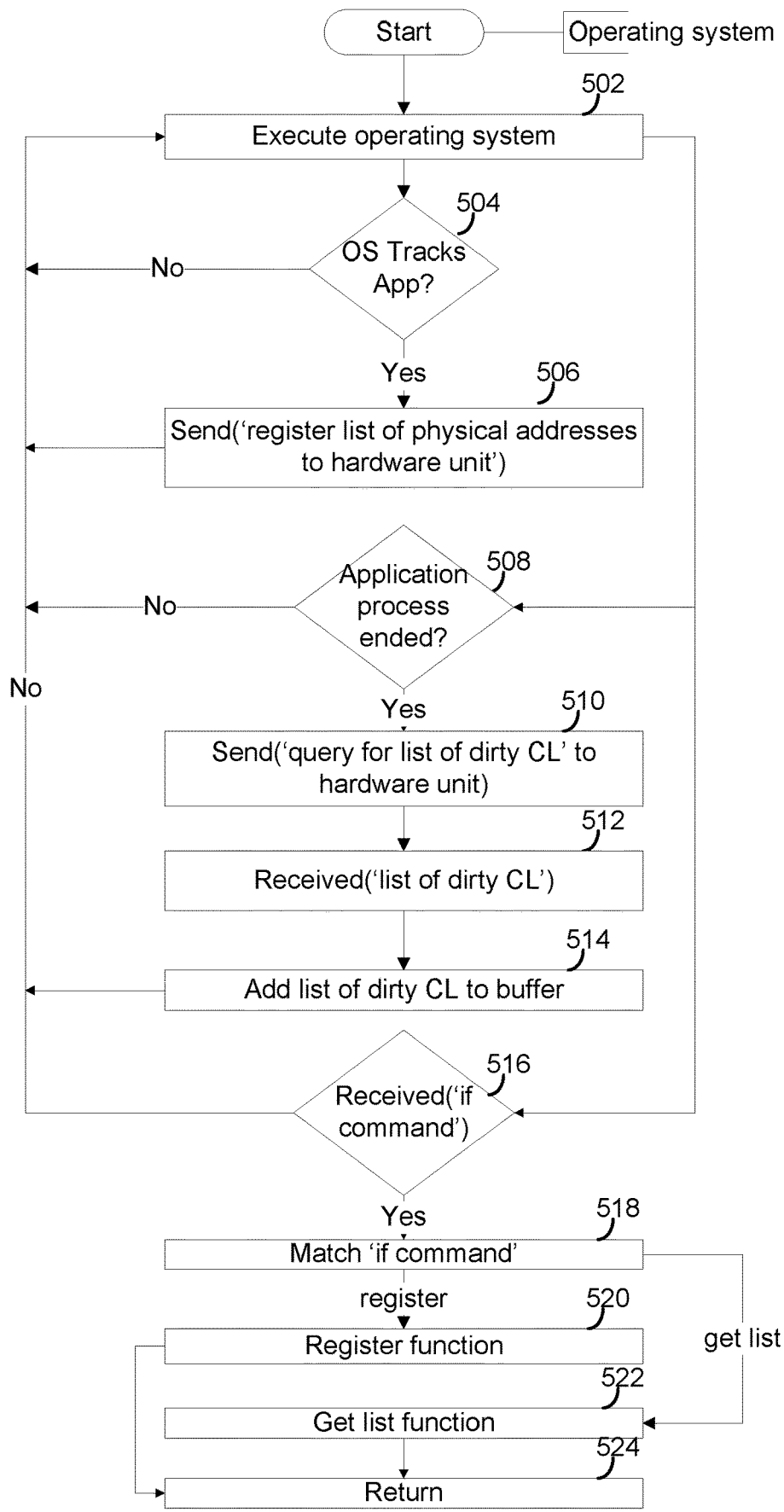
FIG. 5 depicts a flowchart of operations performed by the operating system to support the interface, in an embodiment.

FIG. 5 depicts a flowchart of operations performed by the operating system to support the interface, in an embodiment. In step 502, operating system 306 is executing its code. If code of operating system 306 includes a request to track application 302, as determined in step 504, then code of operating system 306 in step 506 sends a 'register list of physical addresses' to hardware unit 308, where the physical addresses correspond to some or all of the addresses used in application 302. If code of operating system 306 detects in step 508 that a process in which application 302 is running has ended or that tracking is terminated, then in step 510, code of operating system sends a 'query for list of dirty CL' to hardware unit 308. In step 512, code of operating system 306 receives a 'list of dirty CL' message containing the list of dirty cache lines message. In step 514, operating system 306 adds the list to buffer 310. Steps 504-514 describe the case in which operating system tracks application 302 without application 302 requesting the tracking. In this case, operating system 306 does not allow application 302 to access buffer 310.

Continuing with FIG. 5, if code of operating system 306 detects an interface command ('if command'), (i.e., system call) from code of application 302 as determined in step 516, then in step 518, code of operating system 306 matches the command to either a 'register' command or a 'get list' command. If the command is a register command, then in step 520 code of operating system 306 calls register function 316. If the command is a get list command, then in step 522, code of the operating system 306 calls get list function 314. In step 524, after completion of either register function 316 or get list function 314, operating system 306 returns control to application 302 so that it can run.

Figure 6:
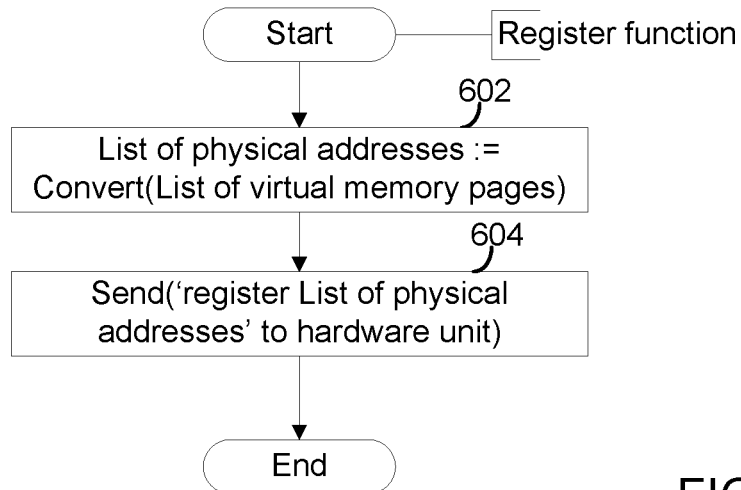
FIG. 6 depicts a flowchart of operations performed by the register function, in an embodiment.

FIG. 6 depicts a flowchart of operations performed by the register function, in an embodiment. In step 602, register function 316 converts a list of virtual memory pages to a list of physical addresses and in step 604, sends a message 'register list of physical addresses' to hardware unit 308.

Figure 7:
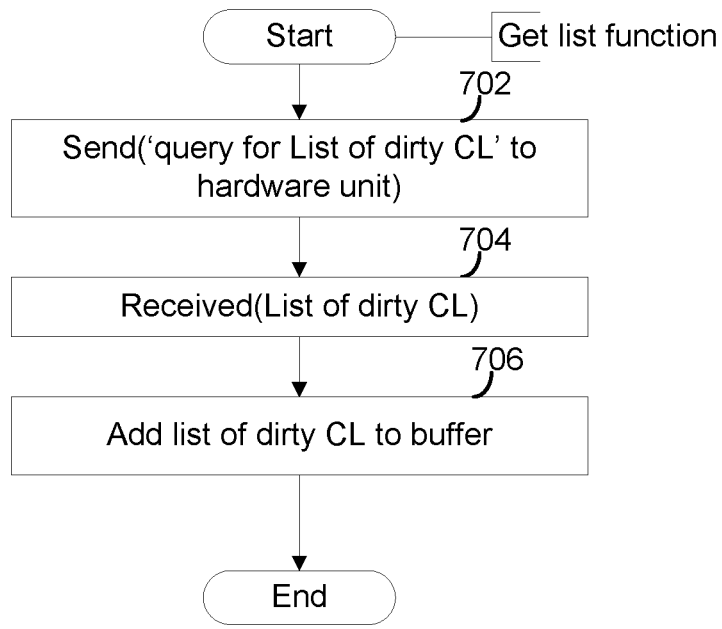
FIG. 7 depicts a flowchart of operations performed by the get list function, in an embodiment.

FIG. 7 depicts a flowchart of operations performed by the get list function, in an embodiment. In step 702, get list function 314 sends a 'query for list of dirty CL' to hardware unit 308. In step 704, get list function 314 receives the list of dirty CL and adds the list in step 706 to buffer 310.

Figure 8:
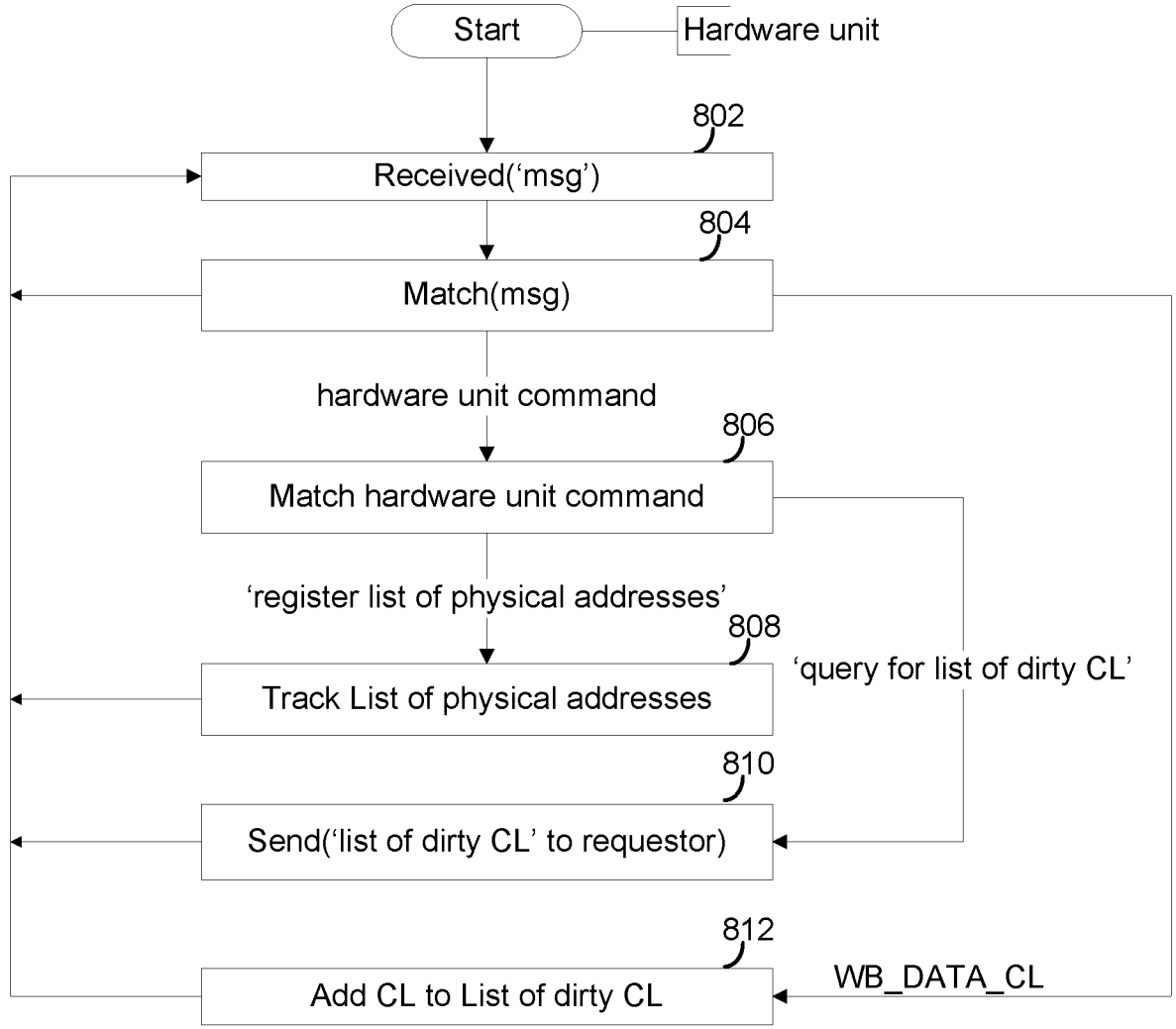
FIG. 8 depicts a flowchart of operations performed by the hardware unit that tracks changes at cache line granularity, in an embodiment.

FIG. 8 depicts a flowchart of operations performed by the hardware unit that tracks changes at cache line granularity, in an embodiment. In step 802, hardware unit 308 receives a message, 'msg' and in step 804 matches the message to either a 'hardware unit command' or a 'WB_DATA_CL' message. If the message is a 'hardware unit command' message, then in step 806, hardware unit 308 matches the message to either a 'register list of physical addresses' message from register function 316 or a 'query for list of dirty CL' message from get list function 314. If the message is a 'register list of physical addresses' message, then in step 808, hardware unit 308 tracks the list of physical addresses received in the message for changes to cache lines corresponding to the physical addresses. If the message is a 'query for list of dirty CL' message, then hardware unit 308 sends in step 810 a 'list of dirty CL' to the requestor, where the message contains the contents of dirty line accumulator 318 collected by hardware unit 308. In an embodiment, hardware unit 308 is included in application-specific modules 218 of FPGA 112 and dirty line accumulator 318 is included in FPGA-Mem 106*b*. In another embodiment, hardware unit 308 and dirty line accumulator 318 are included in memory controller 230*a*, 230*b*.

If hardware unit 308 receives a 'WB_DATA_CL' message, then in step 812, hardware unit 308 adds a cache line corresponding to the WB_DATA_CL message to dirty line accumulator 318. The 'WB_DATA_CL' message is derived from detection of a write back transaction on coherent interconnect 114 by cache protocol agent 220.

Figure 9:
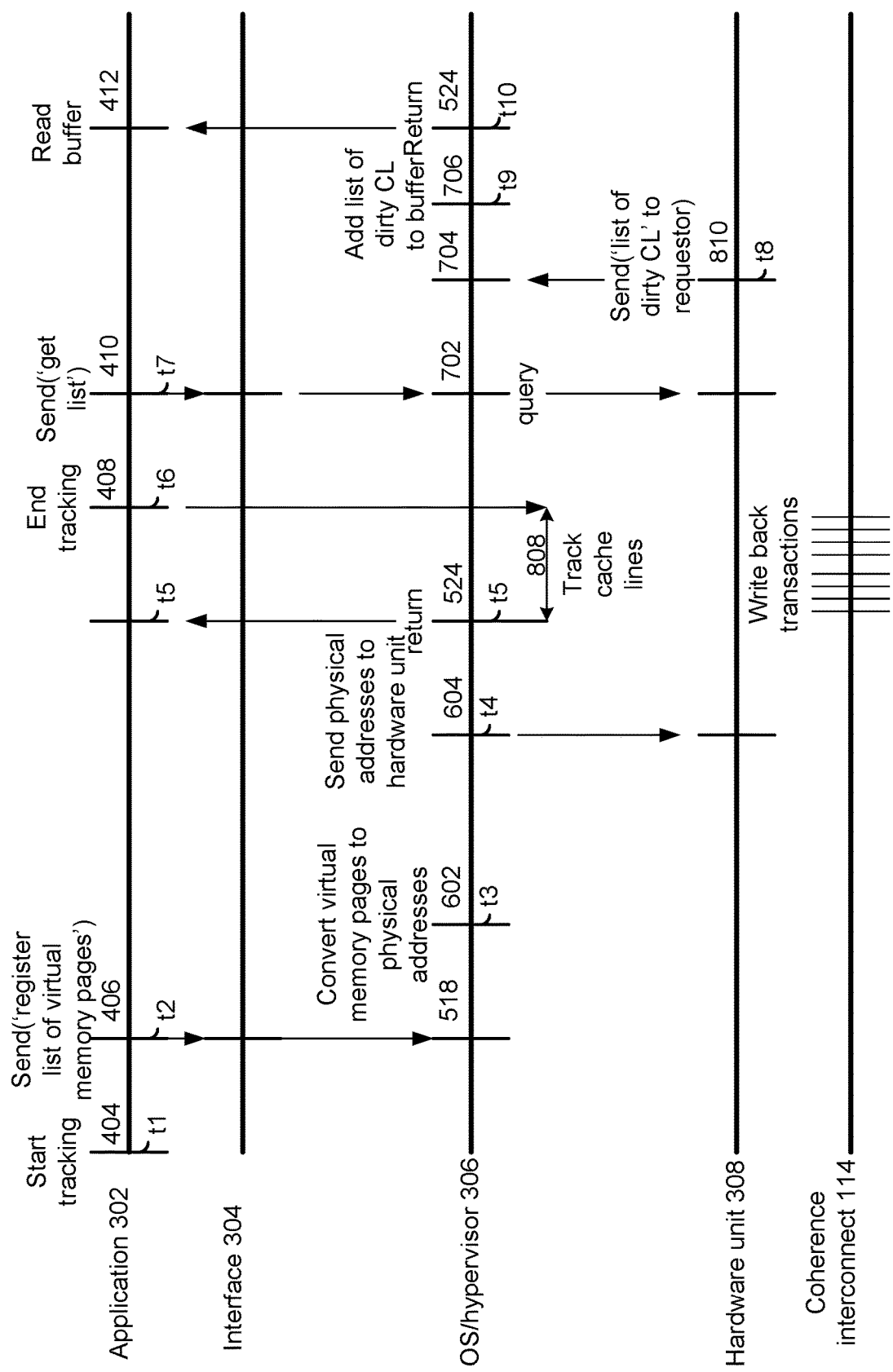
FIG. 9 depicts timelines of operations performed in an embodiment.

FIG. 9 depicts timelines of operations performed in an embodiment. At time t1, code of application 302 decides to start tracking. At time t2, code of application 302 sends a 'register list of virtual memory pages' to operating system 306 via interface 304. In one embodiment, the message is a system call to operating system 306. At time t3, operating system 306 converts a set of virtual memory pages to physical addresses and at time t4 sends the physical addresses to hardware unit 308. Between time t5 and time t6, hardware unit 308 tracks cache lines corresponding to the physical addresses during which hardware unit 308 detects write back transactions on coherence interconnect 114 and adds them to a list of dirty cache lines. At time t6, code of application 302 decides to end tracking. A time t7, code of application 302 sends a 'get list' message to operating system 306, which queries hardware unit 308 for the list of dirty cache lines. At time t8, hardware unit 308 sends its list of dirty cache lines to operating system 306, which adds the list to buffer 310 at time t9. At time t10, operating system 306 returns to application 302, which reads buffer 310 to obtain the dirty cache lines. The application can then use the dirty cache line information to carry out tasks like logging, fault tolerance and data transfers. For example, in the case of fault tolerance, dirty cache line data can be copied repeatedly at small time intervals to unique memory locations to help recovery when the original application encounters a fault and stops operating. An application can also use the dirty cache line information to aid in migrating a live virtual machine, as that information must be copied to the destination memory of the virtual machine before the migration is complete.

As depicted in steps 504-514, the operating system can decide to track application 302 without a request by application 302. Operation is similar to that depicted in FIG. 9 except that operating system 306 does not allow application 302 to access buffer 310 and does not convert virtual memory pages to physical addresses, because operating system 306 already knows the physical addresses of application 302.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer-readable medium refers to any data storage device that can store data which can thereafter be input to a computer system. Computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for tracking changes made by an application, comprising:

starting tracking of an application by sending a command to a hardware unit to register a list of physical addresses for tracking, the list of the physical addresses representing locations in memory changeable by the application;

sending a request to the hardware unit for a list of dirty cache lines after tracking of the application is ended, the list of dirty cache lines being cache lines that were changed and are included in a list of cache lines corresponding to the list of physical addresses registered for tracking;

receiving the list of dirty cache lines from the hardware unit; and adding the list of dirty cache lines to a buffer.

2. The method of claim 1, wherein starting tracking includes:

receiving a list of virtual memory pages from the application; and converting the list of virtual memory pages into the list of physical addresses.

3. The method of claim 2, wherein the buffer is readable by the application.

4. The method of claim 1, wherein the buffer is readable by an operating system and not the application.

5. The method of claim 1, wherein the hardware unit tracks dirty cache lines by:

detecting a write back of a cache line on a coherence interconnect; and adding the detected cache line to a list of dirty cache lines maintained by the hardware unit.

6. The method of claim 1, wherein the hardware unit tracks cache lines corresponding to the list of physical addresses in response to receiving a command to register the list of physical addresses for tracking.

7. The method of claim 1, wherein the hardware unit sends the list of dirty cache lines in response to the request for the list of dirty cache lines.

8. A non-transitory computer-readable medium containing instructions, which when executed by one or more processors, causes the processors to carry out a method for tracking changes made by an application, wherein the method comprises:

starting tracking of an application by sending a command to a hardware unit to register a list of physical addresses for tracking, the list of the physical addresses representing locations in memory changeable by the application;

sending a request to the hardware unit for a list of dirty cache lines after tracking of the application is ended, the list of dirty cache lines being cache lines that were changed and are included in a list of cache lines corresponding to the list of physical addresses registered for tracking;

receiving the list of dirty cache lines from the hardware unit; and adding the list of dirty cache lines to a buffer.

9. The non-transitory computer-readable medium of claim 8, wherein registering the list of physical addresses for tracking includes:

receiving a list of virtual memory pages from the application; and converting the list of virtual memory pages into the list of physical addresses.

10. The non-transitory computer-readable medium of claim 9, wherein the buffer is readable by the application.

11. The non-transitory computer-readable medium of claim 8, wherein the buffer is readable by an operating system and not the application.

12. The non-transitory computer-readable medium of claim 8, wherein the hardware unit tracks dirty cache lines by:

detecting a write back of a cache line on a coherence interconnect; and adding the detected cache line to a list of dirty cache lines maintained by the hardware unit.

13. The non-transitory computer-readable medium of claim 8, wherein the hardware unit tracks cache lines corresponding to the list of physical addresses in response to receiving a command to register the list of physical addresses for tracking.

14. The non-transitory computer-readable medium of claim 8, wherein the hardware unit sends the list of dirty cache lines in response to the request for the list of dirty cache lines.

15. A computing system comprising:

one or more processors running an application and an operating system; and a hardware unit coupled to the one or more processors, wherein the hardware unit is configured to track dirty cache lines;

wherein the operating system is configured to:

start tracking of an application by sending a command to a hardware unit to register a list of physical addresses for tracking, the list of the physical addresses representing locations in memory changeable by the application;

send a request to the hardware unit for a list of dirty cache lines after tracking of the application is ended, the list of dirty cache lines being cache lines that were changed and are included in a list of cache lines corresponding to the list of physical addresses registered for tracking;

receive the list of dirty cache lines from the hardware unit; and add the list of dirty cache lines to a buffer.

16. The computing system of claim 15, wherein the operating system being configured to register the list of physical addresses for tracking includes being configured to:

receive a list of virtual memory pages from the application; and convert the list of virtual memory pages into the list of physical addresses.

17. The computing system of claim 16, wherein the buffer is readable by the application.

18. The computing system of claim 15, wherein the buffer is readable by the operating system and not the application.

19. The computing system of claim 15, wherein the hardware unit being configured to track dirty cache lines includes being configured to track dirty cache lines corresponding to the physical addresses in response to receiving a command for registering the list of physical addresses for tracking.

20. The computing system of claim 15, wherein the hardware unit being configured to track dirty cache lines includes being configured to:

detect a write back of a cache line on a coherence interconnect; and add the detected cache line to a list of dirty cache lines maintained by the hardware unit.

21. The computing system of claim 15, wherein the hardware unit is configured to send the list of dirty cache lines to the operating system in response to the request for the list of dirty cache lines.

* * * * *